United States Patent
Sasaki et al.

(10) Patent No.: US 8,170,003 B2
(45) Date of Patent: May 1, 2012

(54) CONTENT RECOMMENDATION SYSTEM AND METHOD, AND COMMUNICATION TERMINAL DEVICE

(75) Inventors: Toru Sasaki, Tokyo (JP); Yoichiro Sako, Tokyo (JP); Toshiro Terauchi, Tokyo (JP); Makoto Inoue, Tokyo (JP); Mitsuru Takehara, Tokyo (JP); Kosei Yamashita, Kanagawa (JP); Yasushi Miyajima, Kanagawa (JP); Takatoshi Nakamura, Kanagawa (JP); Masafumi Matsuda, Tokyo (JP); Masamichi Asukai, Kanagawa (JP)

(73) Assignee: Sony Corporation, Tokyo (JP)

( * ) Notice: Subject to any disclaimer, the term of this patent is extended or adjusted under 35 U.S.C. 154(b) by 380 days.

(21) Appl. No.: 11/390,737

(22) Filed: Mar. 28, 2006

(65) Prior Publication Data
US 2006/0250994 A1    Nov. 9, 2006

(30) Foreign Application Priority Data
Mar. 28, 2005    (JP) .............................. JP-2005-090696

(51) Int. Cl.
*H04L 12/66* (2006.01)
(52) U.S. Cl. .................... 370/352; 379/93.01; 379/93.07
(58) Field of Classification Search ............... 379/51, 379/67.1, 102.02, 93.01, 93.24, 93.07, 114.01; 370/278, 352, 493, 353
See application file for complete search history.

(56) References Cited

U.S. PATENT DOCUMENTS

| | | | |
|---|---|---|---|
| 4,776,323 A | 10/1988 | Spector | |
| 5,002,491 A | 3/1991 | Abrahamson et al. | |
| 5,119,474 A | 6/1992 | Beitel et al. | |
| 5,137,501 A | 8/1992 | Mertesdorf | |
| 5,648,627 A | 7/1997 | Usa | |
| 6,157,744 A | 12/2000 | Nagasaka et al. | |
| 6,230,192 B1 | 5/2001 | Roberts et al. | |
| 6,336,891 B1 | 1/2002 | Fedrigon et al. | |
| 6,349,275 B1 | 2/2002 | Schumacher et al. | |
| 6,389,222 B1 | 5/2002 | Ando et al. | |
| 6,390,923 B1 | 5/2002 | Yoshitomi et al. | |
| 6,408,128 B1 | 6/2002 | Abecassis | |
| 6,570,078 B2 | 5/2003 | Ludwig | |

(Continued)

FOREIGN PATENT DOCUMENTS
EP       1 039 400 A2    9/2000

(Continued)

OTHER PUBLICATIONS

Chinese Office Action issued May 8, 2009 in connection with Chinese Application No. 200710084909.X.

(Continued)

*Primary Examiner* — Curtis Kuntz
*Assistant Examiner* — Yosef K Laekemariam
(74) *Attorney, Agent, or Firm* — Wolf, Greenfield & Sacks, P.C.

(57) ABSTRACT

A content recommendation system includes first and second communication devices which are connected to each other and in which content recommendation information is transmitted and received between both devices. The first communication device includes a storage section for storing pieces of content recommendation information to be transmitted, a selecting section for selecting a piece of content recommendation information to be transmitted from the storage section, and a transmitting section for transmitting the selected piece of content recommendation information. The second communication device includes a receiving section for receiving the piece of content recommendation information transmitted from the first communication device, and a storage section for storing the received piece of content recommendation information.

21 Claims, 5 Drawing Sheets

U.S. PATENT DOCUMENTS

| | | |
|---|---|---|
| 6,578,047 B1 | 6/2003 | Deguchi |
| 6,662,231 B1 | 12/2003 | Drosset et al. |
| 6,697,824 B1 * | 2/2004 | Bowman-Amuah .......... 709/229 |
| 6,704,729 B1 | 3/2004 | Klein et al. |
| 6,757,482 B1 | 6/2004 | Ochiai et al. |
| 6,807,558 B1 | 10/2004 | Hassett et al. |
| 6,813,438 B1 | 11/2004 | Bates et al. |
| 6,839,680 B1 | 1/2005 | Liu et al. |
| 6,868,440 B1 | 3/2005 | Gupta et al. |
| 6,944,542 B1 | 9/2005 | Eschenbach |
| 6,944,621 B1 | 9/2005 | Collart |
| 7,161,887 B2 | 1/2007 | Snow et al. |
| 7,260,402 B1 * | 8/2007 | Ahmed .......................... 455/445 |
| 7,293,066 B1 | 11/2007 | Day |
| 7,320,137 B1 | 1/2008 | Novak et al. |
| 7,346,920 B2 | 3/2008 | Lamkin et al. |
| 7,395,549 B1 | 7/2008 | Perlman et al. |
| 7,451,177 B1 | 11/2008 | Johnson et al. |
| 7,464,137 B2 | 12/2008 | Zhu et al. |
| 7,521,623 B2 | 4/2009 | Bowen |
| 7,521,624 B2 | 4/2009 | Asukai et al. |
| 7,542,816 B2 | 6/2009 | Rosenberg |
| 7,546,626 B2 | 6/2009 | Ohnuma |
| 7,790,976 B2 | 9/2010 | Takai et al. |
| 7,930,385 B2 | 4/2011 | Takai et al. |
| 2001/0010754 A1 | 8/2001 | Ando et al. |
| 2001/0014620 A1 | 8/2001 | Nobe et al. |
| 2001/0015123 A1 | 8/2001 | Nishitani et al. |
| 2001/0043198 A1 | 11/2001 | Ludtke |
| 2001/0055038 A1 | 12/2001 | Kim |
| 2002/0056142 A1 | 5/2002 | Redmond |
| 2002/0073417 A1 | 6/2002 | Kondo et al. |
| 2002/0085833 A1 | 7/2002 | Miyauchi |
| 2002/0104101 A1 | 8/2002 | Yamato et al. |
| 2002/0152122 A1 | 10/2002 | Chino et al. |
| 2003/0007777 A1 | 1/2003 | Okajima et al. |
| 2003/0018622 A1 | 1/2003 | Chau |
| 2003/0026433 A1 | 2/2003 | Matt |
| 2003/0034996 A1 | 2/2003 | Li et al. |
| 2003/0060728 A1 | 3/2003 | Mandigo |
| 2003/0065665 A1 | 4/2003 | Kinjo |
| 2003/0069893 A1 | 4/2003 | Kanai et al. |
| 2003/0088647 A1 * | 5/2003 | ShamRao ..................... 709/219 |
| 2003/0093790 A1 | 5/2003 | Logan et al. |
| 2003/0113096 A1 | 6/2003 | Taira et al. |
| 2003/0126604 A1 | 7/2003 | Suh |
| 2003/0163693 A1 | 8/2003 | Medvinsky |
| 2003/0212810 A1 | 11/2003 | Tsusaka et al. |
| 2004/0000225 A1 | 1/2004 | Nishitani et al. |
| 2004/0044724 A1 | 3/2004 | Bell et al. |
| 2004/0049405 A1 | 3/2004 | Buerger et al. |
| 2004/0064209 A1 | 4/2004 | Zhang |
| 2004/0126038 A1 | 7/2004 | Aublant et al. |
| 2004/0220830 A1 * | 11/2004 | Moreton et al. .................. 705/2 |
| 2004/0252397 A1 | 12/2004 | Hodge et al. |
| 2004/0255335 A1 | 12/2004 | Fickle et al. |
| 2004/0259529 A1 | 12/2004 | Suzuki |
| 2005/0041951 A1 | 2/2005 | Inoue et al. |
| 2005/0102365 A1 | 5/2005 | Moore et al. |
| 2005/0126370 A1 | 6/2005 | Takai et al. |
| 2005/0241465 A1 | 11/2005 | Goto |
| 2005/0249080 A1 | 11/2005 | Foote et al. |
| 2005/0278758 A1 * | 12/2005 | Bodlaender ..................... 725/89 |
| 2005/0288991 A1 | 12/2005 | Hubbard et al. |
| 2006/0078297 A1 | 4/2006 | Nishikawa et al. |
| 2006/0087925 A1 | 4/2006 | Takai et al. |
| 2006/0107822 A1 | 5/2006 | Bowen |
| 2006/0112411 A1 | 5/2006 | Takai et al. |
| 2006/0174291 A1 | 8/2006 | Takai et al. |
| 2006/0189902 A1 | 8/2006 | Takai et al. |
| 2006/0190413 A1 * | 8/2006 | Harper ............................. 705/65 |
| 2006/0220882 A1 | 10/2006 | Makino |
| 2006/0243120 A1 | 11/2006 | Takai et al. |
| 2006/0245599 A1 | 11/2006 | Regnier |
| 2007/0005655 A1 | 1/2007 | Takehara et al. |
| 2007/0025194 A1 | 2/2007 | Morse et al. |
| 2007/0044010 A1 * | 2/2007 | Sull et al. ..................... 715/500.1 |
| 2007/0067311 A1 | 3/2007 | Takai et al. |
| 2007/0074253 A1 | 3/2007 | Takai et al. |
| 2007/0074619 A1 | 4/2007 | Vergo |
| 2007/0085759 A1 | 4/2007 | Lee et al. |
| 2007/0098354 A1 | 5/2007 | Ando et al. |
| 2007/0186752 A1 | 8/2007 | Georges et al. |
| 2007/0204744 A1 | 9/2007 | Sako et al. |
| 2007/0221045 A1 | 9/2007 | Terauchi et al. |
| 2007/0265720 A1 | 11/2007 | Sako et al. |
| 2008/0153671 A1 | 6/2008 | Ogg et al. |
| 2008/0263020 A1 | 10/2008 | Takehara et al. |
| 2009/0028009 A1 | 1/2009 | Johnson et al. |

FOREIGN PATENT DOCUMENTS

| | | |
|---|---|---|
| EP | 1 128 358 A1 | 8/2001 |
| EP | 1 160 651 A1 | 12/2001 |
| EP | 1 320 101 A2 | 6/2003 |
| EP | 1 503 376 A2 | 2/2005 |
| EP | 1 705 588 A1 | 9/2006 |
| EP | 1 729 290 A1 | 12/2006 |
| EP | 1 746 520 A2 | 1/2007 |
| JP | 04-044096 A | 2/1992 |
| JP | 05-273971 A | 10/1993 |
| JP | 06-290574 A | 10/1994 |
| JP | 07-064547 A | 3/1995 |
| JP | 07-110681 A | 4/1995 |
| JP | 08-152880 A | 6/1996 |
| JP | 08-286663 A | 11/1996 |
| JP | 08-322014 A | 12/1996 |
| JP | 08-328555 A | 12/1996 |
| JP | 09-107517 A | 4/1997 |
| JP | 10-055174 A | 2/1998 |
| JP | 10-124047 A | 5/1998 |
| JP | 10-254445 A | 9/1998 |
| JP | 11-126067 A | 5/1999 |
| JP | 2000-003174 A | 1/2000 |
| JP | 2000-020054 A | 1/2000 |
| JP | 2000-207263 A | 7/2000 |
| JP | 2000-214851 A | 8/2000 |
| JP | 3088409 B2 | 9/2000 |
| JP | 2000-285059 A | 10/2000 |
| JP | 2001-022350 A | 1/2001 |
| JP | 2001-075995 A | 3/2001 |
| JP | 3147888 B2 | 3/2001 |
| JP | 2001-166772 A | 6/2001 |
| JP | 2001-282813 A | 10/2001 |
| JP | 2001-297490 A | 10/2001 |
| JP | 2001-299980 A | 10/2001 |
| JP | 2001-321564 A | 11/2001 |
| JP | 2001-324984 A | 11/2001 |
| JP | 2001-325787 A | 11/2001 |
| JP | 2001-357008 A | 12/2001 |
| JP | 2001-359096 A | 12/2001 |
| JP | 2002-023746 A | 1/2002 |
| JP | 2002-049631 A | 2/2002 |
| JP | 2002-092013 A | 3/2002 |
| JP | 2002-108918 A | 4/2002 |
| JP | 2002-189663 A | 4/2002 |
| JP | 2002-238022 A | 8/2002 |
| JP | 2002-251185 A | 9/2002 |
| JP | 2002-282227 A | 10/2002 |
| JP | 2002-330411 A | 11/2002 |
| JP | 2003-023589 A | 1/2003 |
| JP | 2003-037856 A | 2/2003 |
| JP | 2003-050816 A | 2/2003 |
| JP | 2003-058770 | 2/2003 |
| JP | 2003-150173 A | 5/2003 |
| JP | 2003-157375 A | 5/2003 |
| JP | 2003-162285 A | 6/2003 |
| JP | 2003-177749 A | 6/2003 |
| JP | 2003-224677 A | 8/2003 |
| JP | 2004-073272 A | 3/2004 |
| JP | 2004-078467 A | 3/2004 |
| JP | 2004-139576 A | 5/2004 |
| JP | 2004-151855 A | 5/2004 |
| JP | 2004-173102 A | 6/2004 |
| JP | 2004-185535 A | 7/2004 |
| JP | 2004-199667 A | 7/2004 |
| JP | 2004-222239 A | 8/2004 |
| JP | 2004-226625 A | 8/2004 |

| | | | |
|---|---|---|---|
| JP | 2004-234807 A | 8/2004 | |
| JP | 2004-526372 A | 8/2004 | |
| JP | 2004-252654 A | 9/2004 | |
| JP | 2004-259313 A | 9/2004 | |
| JP | 2004-259430 A | 9/2004 | |
| JP | 2004-282775 A | 10/2004 | |
| JP | 2004-317819 A | 11/2004 | |
| JP | 2004-326840 A | 11/2004 | |
| JP | 2004-361713 A | 12/2004 | |
| JP | 2004-362145 A | 12/2004 | |
| JP | 2004-362489 A | 12/2004 | |
| JP | 2004-362601 A | 12/2004 | |
| JP | 3598613 B2 | 12/2004 | |
| JP | 2005-004604 A | 1/2005 | |
| JP | 2005-043916 A | 2/2005 | |
| JP | 2005-062971 A | 3/2005 | |
| JP | 2005-084336 A | 3/2005 | |
| JP | 2005-093068 A | 4/2005 | |
| JP | 2005-107867 A | 4/2005 | |
| JP | 2005-156641 A | 6/2005 | |
| JP | 2005-196918 A | 7/2005 | |
| JP | 2005-202319 A | 7/2005 | |
| NL | 1023191 C2 | 10/2004 | |
| WO | WO 93/22762 A1 | 11/1993 | |
| WO | WO 01/82302 A1 | 11/2001 | |
| WO | WO 02/05124 A1 | 1/2002 | |
| WO | WO 02/080524 A2 | 10/2002 | |
| WO | WO 02/093344 A1 | 11/2002 | |
| WO | WO 03/043007 A2 | 5/2003 | |
| WO | WO 2004/023358 A1 | 3/2004 | |
| WO | WO 2004/077706 A1 | 9/2004 | |

OTHER PUBLICATIONS

European Search Report issued Jan. 17, 2007 in connection with European Application No. 06254835.9.
European Search Report issued Jan. 19, 2007 in connection with European Application No. 06254352.5.
European Search Report issued Jan. 7, 2008 in connection with European Application No. 05256629.6.
European Search Report issued Jan. 7, 2008 in connection with European Application No. 05256650.2.
European Search Report issued Jul. 3, 2006 in connection with European Application No. 06251591.1.
European Search Report issued Jun. 21, 2007 in connection with European Application No. 07250616.5.
European Search Report issued May 2, 2007 in connection with European Application No. 06253506.7.
European Search Report issued May 2, 2007 in connection with European Application No. 06253769.1.
European Search Report issued Sep. 19, 2007 in connection with European Application No. 07251781.6.
European Summons to Attend Oral Proceedings issued Dec. 20, 2010 in connection with European Application No. 06253506.7.
European Summons to Attend Oral Proceedings issued Oct. 28, 2009 in connection with European Application No. 06251591.1.
Japanese Office Action issued Aug. 13, 2008 in connection with Japanese Application No. 2006-132265.
Japanese Office Action issued Feb. 8, 2011 in connection with Japanese Application No. 2005-194667.
Japanese Office Action issued Jan. 28, 2009 in connection with Japanese Application No. 2005-090696.
Japanese Office Action issued Jul. 15, 2009 in connection with Japanese Application No 2005-271266.
Japanese Office Action issued Jun. 18, 2008 in connection with Japanese Application No. 2004-310874.
Japanese Office Action issued Jun. 18, 2008 in connection with Japanese Application No. 2004-310875.
Japanese Office Action issued May 28, 2008 in connection with Japanese Application No. 2005-012535.
Japanese Office Action issued May 8, 2008 in connection with Japanese Application No. 2006-132265.
Japanese Office Action issued Nov. 6, 2007 in connection with Japanese Application No. 2005-012535.
Japanese Office Action issued Sep. 14, 2010 in connection with Japanese Application No. 2005-194667.
Japanese Office Action issued Sep. 8, 2009 in connection with Japanese Application No. 2005-240315.
International Publication No. WO 02/080524 is an English language counterpart to Japanese Publication No. 2004-526372.
Chang et al., Overview of the MPEG-7 standard. IEEE Transactions on Circuits and Systems for Video Technology. Jun. 2001;11(6):688-695.
Hawley, Structure out of sound. MIT PhD Thesis. 1993, pp. 1-185.
Koike et al., Timeslider: an interface to specify time point. Proc. of the ACM 10$^{th}$ Annual Symposium on User Interface Software and Technology. Oct. 17, 1997, pp. 43-44, Alberta, Canada.
Little et al., A digital on-demand video service supporting content-based queries. http://portal.acm.org/ft_gateway.cfm?id=168450&type=pdf&coll=GUIDE&dl=GUIDE&CFID=16 387603 &CFTOKEN=17953305. Proc. of the First ACM International Conference on Multimedia. New York, Aug. 1, 1993, 9 pages, XP-002429294.
McParland et al., Exchanging TV-anytime metadata over IP networks. Document AN462 submitted to the TV-anytime forum, Sep. 17, 2002, pp. 1-38.
O'Keeffe, Karl, Dancing monkeys. Masters project. Jun. 18, 2003, pp. 1-66.
Zhang et al., Database and metadata support of a web-based multimedia digital library for medical education. http://www.springerlink.com/content/69Ohg1rxv19gwy2q/fulltext.pdf. Proc. of the First International Conference on Advances in Web-based Learning, ICWL 2002. China, Aug. 17, 2002, pp. 339-350, XP002429295.

* cited by examiner

FIG. 3A

| RECOMMENDATION COMMENT INFORMATION, ETC. | SAMPLE |
|---|---|
| MANHATTAN! AT DUSK! | NYview.jpg |
| THIS PIECE OF MUSIC IS THE BEST OF Mike XXXXX, THE SECOND NUMBER OF ALBUM "XXX". | Rocking.mp3 |

FIG. 3B

| DATE AND TIME | PLACE | RECOMMENDER | RECOMMENDATION COMMENT INFORMATION, ETC. | SAMPLE |
|---|---|---|---|---|
| 12/15/2004, 10:30 | FRONT GATE AT TDL | ○○ , TARO | THIS VIEW, MOUNT FUJI! BEAUTIFUL! | MtFuji.jpg |
| 12/24/2004, 19:00 | XX HOTEL, LOBBY | SATO, △△ | MOST FAVORITE CHRISTMAS MUSIC | Santa'sComing.mp3 |
| 12/25/2004, 09:15 | TOKYO STATION | MIKE □□ | MOVING LOVE STORY STARRING X□ KEIKO | Romacne.mpg |
| 12/31/2004, 20:45 | MEIJI SHRINE | ○△, JIRO | IN THIS MYSTERY NOVEL, MYSTERY IS UNSOLVED TO THE LAST. | (none) |

FIG. 3C

| CONTENT TYPE | PREFERENCE KEY WORDS |
|---|---|
| MUSIC | MIKE XXXXX; ROCK; BEATLES; LOVE |
| PHOTOGRAPH | MOUNT FUJI; NIGHT VIEW; LANDSCAPE; PROSPECT; MOUNTAINS; SEA; SKY; DUSK; SUNSET |

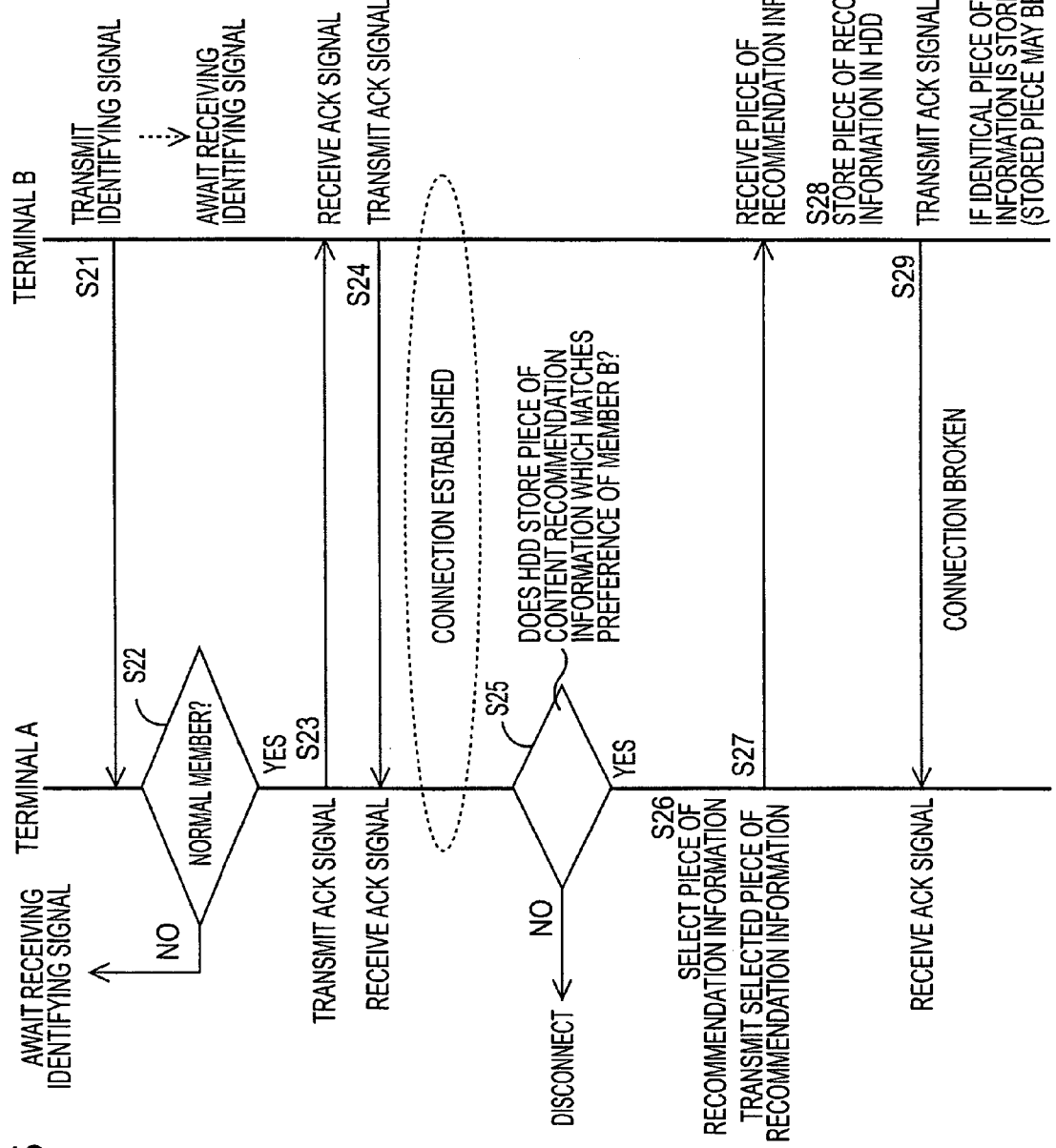

CONTENT RECOMMENDATION SYSTEM AND METHOD, AND COMMUNICATION TERMINAL DEVICE

CROSS REFERENCES TO RELATED APPLICATIONS

The present invention contains subject matter related to Japanese Patent Application JP 2005-090696 filed in the Japanese Patent Office on Mar. 28, 2005, the entire contents of which are incorporated herein by reference.

BACKGROUND OF THE INVENTION

1. Field of the Invention

The present invention relates to a system, device, and method for providing recommendation information concerning various types of content, such as music content and audio/visual (AV) content, which have become abundantly provided through various recording media and through communication media such as the Internet.

2. Description of the Related Art

There have been many proposed methods for selecting or recommending a piece of content that matches user's preference from a very large number of provided pieces of content, such as music data provided in a form recorded on compact discs (CDs), AV data provided in a form recorded on digital versatile discs (DVDs), and, in addition, various types of content provided through networks such as the Internet.

For example, Japanese Unexamined Patent Application Publication No. 2000-048046 discloses a technology in which, in response to tendencies of interests and preferences of a user (customer) who requests a service, corresponding service information (e.g., a recommended CD list, etc.) is provided. In addition, web sites that use the Internet to sell and purchase goods employ methods such as recommending content by referring to a user's past-purchase history and purchase trends of others who are similar in purchase tendency to the user.

In other words, by storing, in units of users, user information such as information of the results of questionnaires in the past, and goods-purchase-history information, and analyzing the stored user information to analyze interests and preference tendencies of the users, for each user, content that matches the user's interest and preference is selected and recommended.

SUMMARY OF THE INVENTION

However, in many cases, so-called "direct mail" from dealers that use the Internet to sell goods, such as content data, may be annoyance for users. In addition, in most cases, provision of information from dealers is performed as a part of goods-sales activities. For users, the provision of information may be provision of unnecessary information, and the reliability of the information may be questionable.

Accordingly, it is common that a user operates a user's personal computer to locate, in various servers on the Internet, content that matches user's preference. However, the user's operation of locating the targeted content by using various types of information takes a lot of time and effort. Also, in a case in which, even if possible content for the targeted content is found, the possible content is not designed for trial listening (trial playback), the possible content needs to be purchased without being checked. Accordingly, the user may feel uneasy about purchasing the content data.

In view of the above circumstances, it is desirable to provide a system, device, and method which realize a new form for providing content recommendation information, and in which provision of content recommendation information having various contents and forms and being necessary for a user is realized without performing a complicated operation or the like.

To solve the above problems, according to an embodiment of the present invention, there is provided a content recommendation system including a first communication device and a second communication device, wherein the first communication device and second communication device are connected to each other and content recommendation information is transmitted and received between the first communication device and the second communication device. The first communication device includes storage means which stores pieces of content recommendation information to be transmitted, selecting means which selects a piece of content recommendation information to be transmitted from among the pieces of content recommendation information stored in the storage means, and transmitting means which transmits the piece of content recommendation information selected by the selecting means to the second communication device, and the second communication device includes receiving means which receives the piece of content recommendation information transmitted from the first communication device, and storage means which stores the piece of content recommendation information received by the receiving means.

According to the content recommendation system according to the embodiment, piece of content recommendation information, selected from among pieces of content recommendation information stored in storage means of a first communication device, is transmitted by transmitting means, whereby the piece of content recommendation information is provided to a second communication device connected to the first communication device. In addition, receiving means of the second communication device receives the piece of content recommendation information from the first communication device, and the received piece of content recommendation information is stored in storage means of the second communication device.

This enables realizing such a new content-recommendation-information providing form that a user can be provided with pieces of content recommendation information from a plurality of communication devices only by moving the user's position while carrying a user's communication device without performing any complicated operation or the like on the communication device, and can provide content recommendation information to a plurality of communication devices. In addition, content recommendation information of a user who actually uses content can be acquired between communication devices, and can be used as effective information for determining whether or not to acquire new content by performing purchase or the like.

In the content recommendation system according to the embodiment, the second communication device may further include transmitting means which transmits user-preference information concerning content. The first communication device may further include receiving means which receives the user-preference information transmitted from the second communication device, and, in the first communication device, the selecting means may select the piece of content recommendation information, which matches the user-preference information received by the receiving means.

According to this content recommendation system, the transmitting means of the second communication device is used to transmit, to the first communication device, preference information of the user of the second communication device. After the preference information is received by receiving means of the first communication device, content recommendation information that matches the preference information is selected from the storage means, and is provided to the second communication device.

This makes it possible to provide the second communication device with content recommendation information that matches preference of the user of the second communication device. In other words, content recommendation information of content matching the preference of the user of the second communication device can accurately be provided, whereby provision of unnecessary content recommendation information that the user does not desire can be prevented.

In addition, the content recommendation system according to the embodiment is applicable to a server (first communication device) and a communication device (second communication device). For example, the server is installed at a predetermined service spot. Content recommendation information stored in storage means of the server is selected by selecting means and is transmitted to a communication terminal device as a communication party. Receiving means of the communication terminal device receives the content recommendation information from the server, and the received information is stored in storage means.

In the content recommendation system according to the embodiment, the second communication device may further include transmitting means which transmits identification information of the second communication device to the first communication device. The first communication device may further include preference-information storage means which stores the identification information of the second communication device, and preference information of content for a user of the second communication device who is identified by the identification information of the second communication device, in a form in which the identification information of the second communication device and the preference information are associated with each other, and receiving means which receives the identification information of the second communication device transmitted from the second communication device, and, in the first communication device, the selecting means may extract a piece of the preference information stored in the preference-information storage means correspondingly to the identification information of the second communication device received by the receiving means, and may select the piece of content recommendation information, which matches the piece of the preference information.

According to this content recommendation system, identification information of a communication terminal device (the second communication device) is transmitted to a server (the first communication device). The server stores identification information of each communication terminal device and preference information of the user of the communication terminal device in a form in which both are associated with each other. After receiving the identification information from the communication terminal device, the server can select content recommendation information matching preference information corresponding to the identification information, and can provide the selected information to the communication terminal device.

According to an embodiment of the present invention, a new form in which content recommendation information is provided, with communication devices used, can be realized. In addition, an environment in which content recommendation information having various contents and forms can be acquired can be established, thus making it possible to form a providing channel of content recommendation information that serves as an important criterion for using and purchasing content.

The terminal device of the above embodiment is of a so-called "portable type", as described above. The terminal device has reduced size and weight, and can be carried, with it put in a location such as a pocket of user's clothes or a bag. Accordingly, also in a place such as a location where the user is out, various types of content, such as music and images, can be played back for use.

In addition, a recommendation comment, sample data, etc., which are acquired by a user can be provided as user's content recommendation information to another user, so that a massive effect of word-of-mouth sales promotion can be expected.

BRIEF DESCRIPTION OF THE DRAWINGS

FIGS. 3A, 3B, and 3C are illustrations of storage areas, formed in the HDD 4 shown in FIG. 1, concerning content recommendation information, and specific examples of information stored in the areas;

FIG. 5 is a timing chart illustrating a communication process performed between a server and terminal device B in a second embodiment of the present invention.

DESCRIPTION OF THE PREFERRED EMBODIMENTS

Devices and methods according to embodiments of the present invention are described below with reference to the accompanying drawings.

1. First Embodiment

Figure 1:
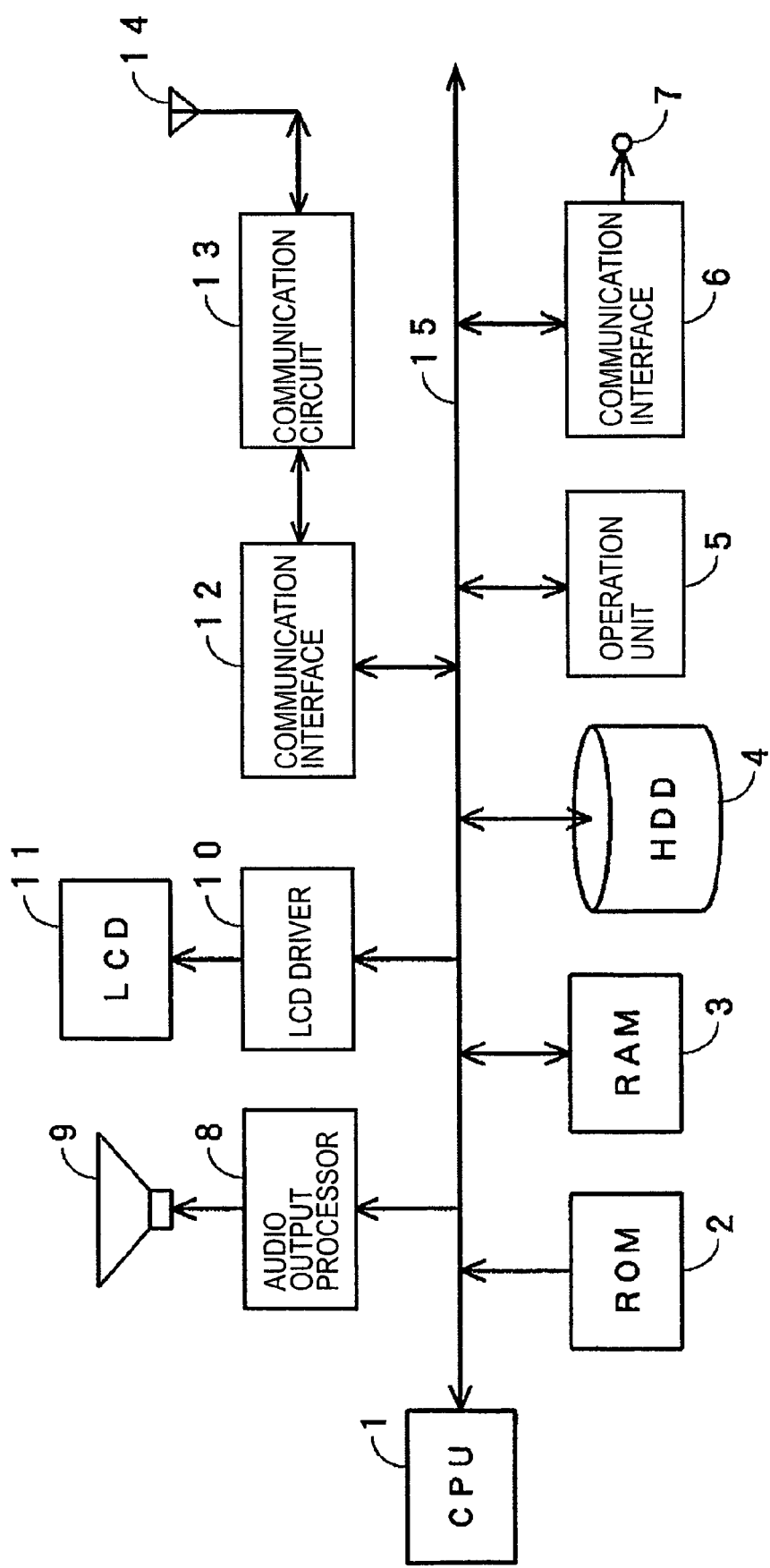
FIG. 1 is a block diagram illustrating a terminal device to which an embodiment of the present invention is applied.

Transmission and Reception of Content Recommendation Information by Two Terminal Devices 1-1. Configuration of Portable Terminal Device FIG. 1 is a block diagram illustrating a portable terminal device according to a first embodiment of the present invention. As shown in FIG. 1, the terminal device according to the first embodiment includes a central processing unit (CPU) 1, a read-only memory (ROM) 2, a random access memory (RAM) 3, a hard disk drive (HDD) 4, an operation unit 5, a communication interface 6, a communication terminal 7, an audio output processor 8, a speaker 9, an LCD (liquid crystal display) driver 10, an LCD 11, a communication interface 12, a communication circuit 13, and a transmitting/receiving antenna 14.

The CPU 1 generates control signals by executing programs to perform processing such as various types of arithmetic operations. The CPU 1 controls the entirety of the terminal device by supplying the control signals to portions of the terminal device. The ROM 2 stores control programs that are executed by the CPU 1, unique identification (ID) information for identifying the terminal device, etc.

By using, as the ROM 2, a so-called "nonvolatile memory", such as a flash memory, which is a type of an EEPROM (electronically erasable and programmable read only memory), the ROM 2 can be configured to store data, even if the terminal device is switched off, and so that programs and data are rewritten, if necessary.

The RAM 3 is used as a work memory necessary for the CPU to operate, and is also used as a temporary buffer for use in decoding (described later) of audio data and image data. The CPU 1, the ROM 2, and the RAM 3 are connected to one another by a CPU bus 15 to constitute a microcomputer that controls the portions of the terminal device according to this embodiment.

The HDD 4 includes a hard disk as a recording medium. The HDD 4 can write data on the hard disk, and can read the data written on the hard disk. Obviously, even if the terminal device according to this embodiment is switched off, so that power supply to the HDD 4 is stopped, the data written (stored) on the hard disk in the HDD 4 is not lost.

The operation unit 5 includes an operation button switch, an operation key, and an operation knob which are used to receive operation inputs from a user. The operation unit 5 can use these to receive an operation input from the user, can convert the received input to an electric signal, and can notify the CPU 1 of the received input. This allows the CPU 1 to control the portions of the terminal device according to this embodiment in response to the operation inputs from the user.

The operation unit 5 can be provided on a display screen (described later) of the LCD 11, and can be formed by a touch screen for receiving operation inputs from the user and an interface circuit for notifying the CPU 1 of an operation input (instruction information) received through the touch screen. Also, the operation unit 5 can be formed by a pointing device such as a so-called "mouse". In addition, an operation section corresponding to the above-described functional units can also be used.

The communication interface 6 is an interface circuit complying with a digital interface such as, for example, USB (Universal Serial Bus). The communication interface 6 is used to transmit/receive data and program to/from various types of external devices such as personal computers. The communication terminal 7 is used to accept connection to an external device.

The audio output processor 8 generates, from supplied audio data, an output audio signal to be supplied to the speaker 9. Specifically, when being supplied with audio data that is compressed in, for example, ATRAC3plus (Advanced TRansform Acoustic Coding 3 plus), the audio output processor 8 decodes the audio data to restore the original audio data before data compression. The audio output processor 8 converts the original audio data into an analog audio signal, amplifies the analog audio signal, and supplies the amplified signal to the speaker 9. This allows the speaker 9 to emit sound corresponding to the audio data supplied to the audio output processor 8. As described above, the audio output processor 8 has audio-decoder-and-amplifier-unit functions.

After being supplied with image data stored in a video RAM area of the RAM 3, or image data stored in the HDD 4, the LCD driver 10 converts the image data into an image signal to be supplied to the LCD 11 in a subsequent stage. Specifically, after being supplied with image data that is compressed in a predetermined compression standard such as MPEG (Moving Picture Experts Group) or JPEG (Join Photographic Experts Group), the LCD driver 10 decodes the image data to restore the original image data before data compression, converts the image data into an analog image signal, and supplies the analog image signal to the LCD 11. This allows the display screen of the LCD 11 to display an image corresponding to the image data supplied to the LCD driver 10.

The LCD 11 of the terminal device according to this embodiment only needs to display at least text-based information. However, the LCD 11 can obviously display graphics images such as a thumbnail image and an icon.

The communication interface 12, the communication circuit 13, and the transmitting/receiving antenna 14 are used to perform data transmission to and data reception from an external device through wireless connection. The communication interface 12 performs processing such as converting received data into data having a format capable of being processed by the terminal device, and converting data to be transmitted from the terminal device into data having a format for transmission. The communication circuit 13 performs processing such as supplying the communication interface 12 with a demodulated signal obtained by demodulating a signal received through the transmitting/receiving antenna 14, and transmitting a transmission signal through the transmitting/receiving antenna 14 after modulating transmitting data from the communication interface 12 to generate the transmission signal.

The communication interface 12, the communication circuit 13, and the transmitting/receiving antenna 14 are used, whereby wireless communication can establish connection with a terminal device of the same model, or connection between the terminal device and an external device such as a server through a predetermined network. The communication interface 12, the communication circuit 13, and the transmitting/receiving antenna 14 can be configured to use various wireless communication standards such as Bluetooth, IEEE (Institute of Electrical and Electronics Engineers) 804.11x, and UWB (Ultra Wide Band).

In addition, an infrared wireless communication standard, such as IrDA (Infrared Data Association), can be used. In this case, instead of the transmitting/receiving antenna 14, an optical receiving element (receiving element), such as a photodiode for infrared reception, and a light emitting element, such as a light emitting diode for infrared transmission, may be used.

As described above, the terminal device according to this embodiment can transmit and receive data by using wireless communication, in other words, the terminal device can perform bidirectional communication. In general, identical communication media and methods are used between a transmitting system and a receiving system. However, the communication media and methods used by the transmitting and receiving systems are not limited to the identical communication media and methods.

Obviously, it is possible that the transmitting system and the receiving system selectively use infrared communication and radio communication. It is also possible that the transmitting system and the receiving system use different communication methods such as OFDM (Orthogonal Frequency Division Multiplexing), FM (Frequency Modulation), and CDMA (Code Division Multiple Access). In other words, communication media and communication methods may be combined for use, if necessary, in accordance with conditions of use such as a data size and a communication rate.

The terminal device according to this embodiment can receive audio data such as music, and image data such as still images and video, for example, from an external device such as a personal computer connected through the communication interface 6 and the communication terminal 7, and can record and store the audio data and the image data in the HDD 4.

Content data, such as the audio data and image data stored in the HDD 4, is read in response to an operation input from the user which is received by the operation unit 5. The audio data is played back by using the audio output processor 8 and the speaker 9, while the image data is played back by using the LCD driver 10 and the LCD 11.

The terminal device according to this embodiment is a so-called "portable terminal device", as described above. The terminal device has reduced weight and size, and can be carried, with it put in a location such as a pocket of user's clothes or a bag. Accordingly, also in a place such as a location where the user is out, various types of content, such as music and images, can be played back for use.

In addition, the terminal device according to this embodiment has a near field wireless communication function realized by the communication interface 12, the communication circuit 13, and the transmitting/receiving antenna 14, as described above. In a place such as a location where the user is out, the terminal device can automatically collect and store, in a predetermined area of the HDD 4, content recommendation information by communicating with another terminal device of the same model without requesting anything from the user, and can display the information on the LCD 11. Alternatively, the terminal device can supply collected content recommendation information or the like to the personal computer, such as an external device, through the communication interface 6 and the communication terminal 7, whereby the collected content recommendation information or the like can be used.

The content recommendation information is, for example, recommendation information concerning CD content on sale, such as music, and DVD content on sale, such as movies, as also described later. The content recommendation information of these types can automatically be transmitted and received between terminal devices. Therefore, only by carrying the terminal device according to this embodiment, the user can receive pieces of content recommendation information provided from a plurality of terminal devices. The content recommendation information is directly exchanged between terminal devices carried by users, thus enabling one user to directly obtain information from another user who actually uses content.

As described above, the terminal device according to this embodiment can automatically collect content recommendation information from a user's point of view which differs from advertisement information from a content-provider's point of view, and can utilize the collected information.

1-2. Operation of Terminal Device

Next, an example of an operation in a case in which two terminal devices, as described in the above embodiment described with reference to FIG. 1, communicate with each other is described below. The following exemplifies a case in which terminal devices A and B, as described in the above embodiment, communicate with each other. Each of terminal devices A and B is as described in the above embodiment, and has a configuration and functions as described with reference to FIG. 1. In addition, a system formed by terminal devices A and B is one to which a system and method according to embodiments of the present invention are applied.

Under the control of the CPU 1, in each of terminal devices A and B, a communication interface 12, a communication circuit 13, and a communication antenna 14 function to intermittently emit a unique identifying signal. The identifying signal is information, such as terminal ID and personal ID, that is used to recognize and identify each terminal device. Necessary information, such as a code corresponding to a model name and a code representing this service (content-recommendation-information transmitting/receiving service), can be added to the identifying signal, if necessary. Timing for transmitting the identifying signal differs depending on each terminal since it is determined for the terminal.

After each of the terminal devices A and B transmits the identifying signal, it enters a state of awaiting receiving an identifying signal from the other terminal until it transmits the identifying signal next time. When the terminal devices A and B are close to each other within a predetermined distance, a communication process is automatically initiated between both terminals. Here, a case in which terminal device A transmits its identifying signal and terminal device B receives the transmitted identifying signal is exemplified.

Figure 2:
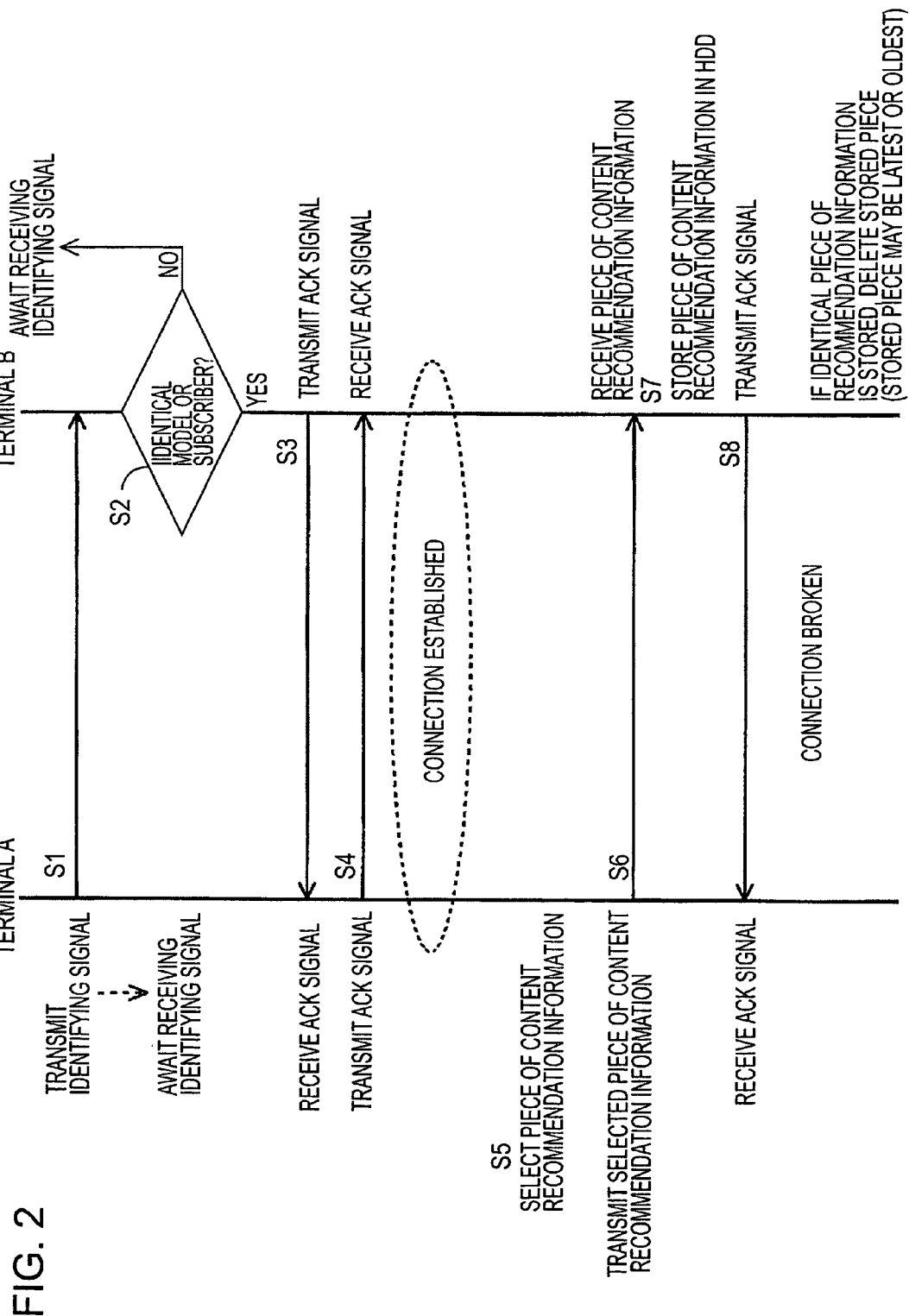
FIG. 2 is a timing chart of a communication process performed in communication between terminal devices A and B each having the configuration shown in FIG. 1 when an identifying signal from terminal device A is received by terminal device B.

FIG. 2 is a timing chart of a communication process performed when, in communication between terminal devices A and B, terminal device B receives the identifying signal from terminal device A. As shown in FIG. 2, in step S1, after terminal devices A and B are close to each other and terminal device A transmits an identifying signal, the identifying signal is received by terminal device B.

In step S2, on the basis of the received identifying information, terminal device B determines whether or not the received identifying information has been transmitted from a terminal device of a model identical to that of terminal device B, or from a terminal device subscribing a service identical to that subscribed by terminal device B. If, in step S2, it is determined that the received identifying information has not been transmitted from the terminal device of the identical model or from the terminal device subscribing the identical service, the received information is ignored, and the CPU 1 controls the portions of terminal device B to allow terminal device B to be in awaiting an identifying signal from the other terminal device. After that, terminal device B changes to a transmitting mode of transmitting the identifying signal from terminal device B.

If, in step S2, it is determined that the received identifying information has been transmitted from the terminal device of the identical model or from the terminal device subscribing the identical service, in step S3, terminal device B transmits its identifying signal as an ACK (acknowledge) signal to terminal device A.

In step S4, after receiving the ACK signal from terminal device B, terminal device A transmits an ACK signal to terminal device B and terminal device B receives the ACK signal. As described above, both terminal devices A and B receive the ACK signals, whereby connection (telecommunication) is established between terminal devices A and B, so that terminal devices A and B can communicate with each other.

Connection for the above connection may have forms used in communication standards such as IEEE 802.11x and Bluetooth, which are known as ad hoc network specifications, whereby a form in which a plurality of terminal devices connect to one another without using any access point can be realized.

In step S5, after the connection is established, from pieces of content recommendation information stored in a transmitting area of the HDD 4 of terminal device A, terminal device A selects a piece of content recommendation information to be transmitted. In step S6, terminal device A transmits the selected piece of content recommendation information. In this case, information transmitted from terminal device A to terminal device B is not only the piece of content recommendation information. In addition, by adding an owner name or authentication ID of terminal device A, which is information specifying a recommender of content, and information such as a date and time of transmission and a place of transmission, the above information can be transmitted as one set of information.

In step S7, terminal device B receives the piece of content recommendation information from terminal device A, and temporarily stores the received piece of content recommendation information (set of content recommendation information) in a receiving area of the HDD 4 in terminal device B. The temporarily stored piece of content recommendation information is, as described above, one set of the owner name or authentication ID of terminal device A, the date and time of transmission, the place of transmission, and the content recommendation information. After that, in step S8, terminal device B transmits an ACK signal to perform disconnection.

After that, terminal device B checks whether or not the HDD 4 stores received information which is identical in content to the temporarily stored content recommendation information and which has identical authentication ID. If the HDD 4 stores the received information, either piece of information is deleted. The reason of the deletion is that, in cases such as, when terminal devices A and B remain unmoved for a while, with both positioned close to each other, and when terminal devices A and B repeat moving close and moving apart, there is a possibility that the consecutive recommendation process shown in FIG. 2 may be repeatedly performed a number of times.

In such cases, when a date and time at which the content recommendation information is provided for the first time is regarded as important, the latest information (the temporarily stored content recommendation information) may be deleted. When a last date and time at which the content recommendation information is last provided is regarded as important, the oldest information may be deleted. In addition, when the HDD 4 has a sufficient free storage amount, obviously, all the information may be stored without being deleted.

The communication process between both terminal devices, described with reference to FIG. 2, is automatically performed regardless of whether or not each user is aware of the process. Accordingly, the user can initially know the existence of the content recommendation information by accessing the content recommendation information that is the received information stored in the HDD 4. By later operating the operation unit 5 of the terminal device, the user checks whether or not new content recommendation information has been received. Obviously, by transferring the content recommendation information to a personal computer at a home which is connected to the communication terminal 7, and using the personal computer, the user checks whether or not new content recommendation information has been received.

The user can read a recommender's name and recommendation comment included in the content recommendation information, and can play back sample data if it is attached, and, if the content recommendation information includes an access URL (uniform resource locator) to (trial) content the user desires to try to play back, the user can select the URL and download the trial content for playback. If the user of terminal device B likes the played-back trial content, the user can purchase the content through a dealer or a network.

An example of the content recommendation information stored in the HDD 4 of each of the terminal devices A and B is described below. FIGS. 3A, 3B, and 3C are illustrations of specific examples of storage areas formed in the HDD 4 concerning the content recommendation information and pieces of information stored. As described above, the HDD 4 includes the transmitting area (FIG. 3A) that stores not only content data such as music data and image data, but also pieces of content recommendation information to be transmitted, a receiving area (FIG. 3B) that stores received content recommendation information, and preference information area (FIG. 3C) that stores user's information area (FIG. 3C).

As shown in FIG. 3A, the transmitting area is a portion of the HDD 4 that stores pieces of content recommendation information to be transmitted. In this embodiment, the content recommendation information stored in the transmitting area of the HDD 4 includes information of recommenders' recommendation comments, and locations at which sample data items of recommended content are stored.

By operating the operation unit 5, or operating the personal computer connected through the communication interface 6 and the communication terminal 7, a user who has content to recommend enters, in a field formed in the HDD 4 for recommendation comment information, etc., of the content recommendation information, various types of text information such as features of recommended content and recommendation reasons, and enters, in a sample field, information representing sample-data storage locations.

If sample data is attached, a file name, or the like, of the sample data is used as the information representing a sample-data storage location. If the sample data is stored in a server on the Internet, its access URL is used. As described above, the content recommendation information to be transmitted does not contain only the information shown in FIG. 3A. Necessary information, such as an owner of a transmitting terminal device, a date and time of transmission, and a place of transmission, is added to the content recommendation information, whereby a set of content recommendation information is transmitted.

In this case, as the date and time of transmission, the present time that is acquired from a clock circuit of a terminal device that transmits the content recommendation information may be used. Regarding the place of transmission, for example, if the terminal has a built-in GPS (global positioning system), the GPS information may be used to specify the place of transmission, and the specifying information may be used. Alternatively, information representing the latitude and longitude (detected by the GPS) of the place of transmission which indicate the present position can directly be transmitted. In addition, the owner name of the terminal may be used as the recommender.

As described above, when the user has content to recommend, by forming the content recommendation information as shown in FIG. 3A, pieces of content recommendation information stored in the transmitting area can be selectively transmitted to a terminal device of the identical model or a terminal device that can use a service of transmitting/receiving content recommendation information, without causing the user to be aware of the transmission.

After receiving the piece of content recommendation information, the terminal device stores the received piece of content recommendation information in the receiving area formed in the HDD 4 of the terminal device. As shown in FIG. 3B, the piece of content recommendation information stored in the receiving area includes a date and time of transmission, a place of transmission, a recommender, recommendation comment information, etc., and a storage location of sample data. Although, in this example, the terminal device at the transmitting end is used as a reference, by using the terminal device at the receiving end as a reference, information of the terminal device at the receiving end may be used to add a date and time of reception and a place of reception, and the date and time of reception and the place of reception may replace the date and time of transmission and the place of transmission.

This enables the user of a terminal device having received the piece of content recommendation information to search for a favorite piece of content on the basis of pieces of content recommendation information which are automatically stored in the terminal device. In addition, the pieces of content recommendation information provided are transmitted from terminal devices of users having actually used content data items, thus making it possible to know direct responses of content users. In other words, pieces of content recommendation information from the standpoint of content users can be collected from an unspecified number of users and can be utilized.

As shown in FIG. 3C, by entering, in the preference information area of the HDD 4, preference information including content types and preference keywords of the user of the terminal device, and using the preference information to selectively use pieces of content recommendation information, only a piece of content recommendation information that matches user's preferences can be obtained. Therefore, only necessary pieces of content recommendation information can be collected, thus making it possible to change or extend a utilization range of the terminal device.

Regarding the content recommendation information described with reference to FIGS. 3A to 3C, main information contains recommendation comment information and sample-data storage-location information. However, the main information is not limited thereto. The content recommendation information represents various types of information concerning a piece of content the user likes (desires to recommend) among pieces of content owned by the user of the terminal device, for example, CD music, still pictures such as electrophtographs and CG (computer graphics) images, DVD video, and text data such as novels.

Accordingly, for example, as pieces of content recommendation information for music content, an album title, a music title, an artist name, a genre, a disk identifying code, an access URL to sample data (for trial listening) or sample data, a price, a recommendation comment, etc., can be used. Among these pieces of information, a piece of information entered into the terminal device can be used.

For photograph content (still picture content), as pieces of content recommendation information, a date and time of shooting, a place of shooting, a shooting comment, an access URL to thumbnail image or thumbnail image, a price (only when it exists), and a recommendation comment, etc., can be used. Among these pieces of information, a piece of information entered into the terminal device can be used. In addition, for video content, as pieces of content recommendation information, a title, a genre, the names of actors and director, a disk identifying code, an access URL to sample data or sample data, a price, a recommendation comment, etc., can be used. Among these pieces of information, a piece of information entered into the terminal device can be used.

For book content, as pieces of content recommendation information, a book name, an author, an identification code (such as ISBN code), an access URL (only when it exists), a price, a recommendation comment, etc., can be used. Among these pieces of information, a piece of information entered into the terminal device can be used.

It is preferable that most of the above pieces of content recommendation information be transmitted, received, and stored, with their text data form unchanged, since they are displayed on the LCD 11 of the terminal device or by the personal computer connected to the communication terminal 7. However, in an embodiment of the present invention, the form of the above pieces of content recommendation information is not limited to text data. Instead, after converting the above pieces of content recommendation information into various types of forms, the converted pieces of content recommendation information can be transmitted, received, and stored.

In addition, in the case of the example described with reference to FIG. 2, the information transmitted from terminal device A includes at least recommendation comment information and sample-data storage-location information. In other words, the owner name or authentication ID and the date and time of transmission are optional pieces of information. Setting of whether to use these pieces of information can be performed by the user of each terminal device. In particular, even if the date and time of transmission are not transmitted, at the time that terminal device B receives information, a time of reception may be recorded in the receiving area after being read from a timer (not shown) of terminal device B. In this case, the time of reception is approximately equivalent to the time of transmission although the meaning of the time of reception is stronger.

When terminal devices A and B have GPS receiving functions as described above, by recording positional information at a transmitting or receiving time in a memory of either terminal device, convenience is obtained when referring to a receiving list. However, since direct use of numerical information such as latitude and longitude is inconvenient, in a terminal device or in a personal computer to which data is transferred, the numerical information may be recorded after being converted into map information (link to a map image) or a building name or the like as a landmark.

Regarding positional information such as a place of transmission, for example, by using radio waves from a plurality of base stations for cellular telephone and specifying an approximate range around a transmitting position, the approximate range can be used. In other words, regarding the positional information such as a place of transmission, various methods can be used.

In the case described with reference to FIG. 2, the user of terminal device B can read the piece of content recommendation information received from terminal device A, and can play back (or purchase) a trial piece of content. If the user of terminal device B likes the trial piece, the user of terminal device B can record a piece of content recommendation information in the transmitting area of the HDD 4 by entering a new recommendation comment. In addition, by also using the piece of content recommendation information received from the terminal device A, only the recommender's information can be rewritten into recommendation information.

1-3. First Modification

In the above-described first embodiment, as described with reference to FIG. 2, terminal device A transmits, to terminal device B, a piece of content recommendation information arbitrarily selected from the pieces of content recommendation information stored in the transmitting area of the HDD 4 in terminal device A. However, the selection and transmission are not limited to those in the above-described first embodiment. For example, in response to preference of the owner of terminal device B, terminal device B can select a piece of content to be received. This case broadly has two methods.

In one method, in an initial stage in establishing ad hoc connection, terminal device A transmits a piece of content recommendation information that terminal device A needs to provide together with an identifying signal, and terminal device B receives the piece of content recommendation information and the identifying signal, and confirms whether or not the received identifying signal has been transmitted from a terminal device identical in model to terminal device B, or whether or not the received identifying signal has been transmitted from a terminal device subscribing a service identical to that subscribed by terminal device B. Terminal device B further confirms whether or not the received piece of content recommendation information includes information that matches preference information of terminal device B.

In this method, the preference information of the user of terminal device B is registered in the preference information area of the HDD 4 in terminal device B, as described with reference to FIG. 3C. As shown in FIG. 3C, for example, in the preference information area of the HDD 4 of terminal device B, favorite artist names, actors, authors, genres, etc., of the user of terminal device B are recorded.

Terminal device B uses, as keywords, the preference information recorded in the HDD 4 of terminal device B, establishes connection if the piece of content recommendation information received from terminal device A includes any one of the keywords, and stores the received piece of content recommendation information in the receiving area of the HDD 4. After that, terminal device B breaks the connection and enters a state of awaiting receiving an identifying signal. If the piece of content recommendation information received from terminal device A does not include any one of the keywords, terminal device B enters the state of awaiting receiving the identifying signal without establishing the connection and storing the piece of content recommendation information in the receiving area of the HDD 4.

In the above description, in the initial stage of establishing the connection, the piece of content recommendation information is transmitted and received. However, the above description is not a limitation. For example, some pieces of information which are usable in comparison with the keywords in terminal device B, such as the recommendation comment information and information representing a comment type, are transmitted from terminal device A to terminal device B in the initial stage of establishing the connection.

After that, terminal device B uses, as keywords, the preference information recorded in the HDD 4 of terminal device B, and establishes connection if the piece of content recommendation information received from terminal device A includes any one of the keywords. After being supplied with the remaining part of the piece of content recommendation information from terminal device A, or the entirety of one set of content recommendation information from terminal device A, terminal device B stores the supplied information in the receiving area of the HDD 4, whereby the connection may be broken to set terminal device B to be in the state of awaiting receiving the identifying signal.

The preference information shown in FIG. 3C includes an item called the "content type". This item is necessary to avoid a situation in which, despite that recommendation of a "photograph" of a "mountain" is needed, "music" having a title and an artist name which include a "mountain" is recommended. In this case, if content-type information is added to the piece of content recommendation information, by comparing the content-type information in the transmitted piece of content recommendation information, and the content type of the information stored in the preference information area, it can be easily and accurately determined whether or not the transmitted piece of content recommendation information is a piece of content recommendation information to be acquired.

In the other method, after the connection is established, terminal device A transmits a piece of content recommendation information, and, similarly as above, it is confirmed whether or not the piece of content recommendation information includes information that matches the preference information recorded in terminal device B. If the information is included, the piece of content recommendation information may temporarily be stored, and, if the information is not included, the connection may be broken without temporarily storing the piece of content recommendation information.

Also, after the connection is established, some pieces of information for use in comparison with the keywords in terminal device B, such as recommendation comment information and content-type information, are transmitted from terminal device A to terminal device B. Terminal device B uses, as keywords, the preference information recorded in the HDD 4 in terminal device B. If the pieces of information received from terminal device A includes any one of the keywords, after terminal device B receives the remaining information of the content recommendation information, and stores the received pieces of information as a set of information in the receiving area of the HDD 4, terminal device B may break the connection to set terminal device B in a state of awaiting receiving an identifying signal.

As described above, from terminal device A, terminal device B can receive only pieces of content recommendation information that match the preference information recorded in the HDD 4 in the terminal device B. In other words, the user of terminal device B can receive only content recommendation information of content matching the preference of the user of terminal device B.

1-4. Second Modification

In the first embodiment described with reference to FIG. 2, terminal device A actively transmits content recommendation information. However, there is a case in which it is only necessary to provide content recommendation information only to a terminal device that needs to receive content recommendation information. A second modification is an example in which content recommendation information is provided only to a terminal device that requests provision of the content recommendation information. In the second modification, content recommendation information is provided in a so-called "on-demand" manner.

Figure 4:
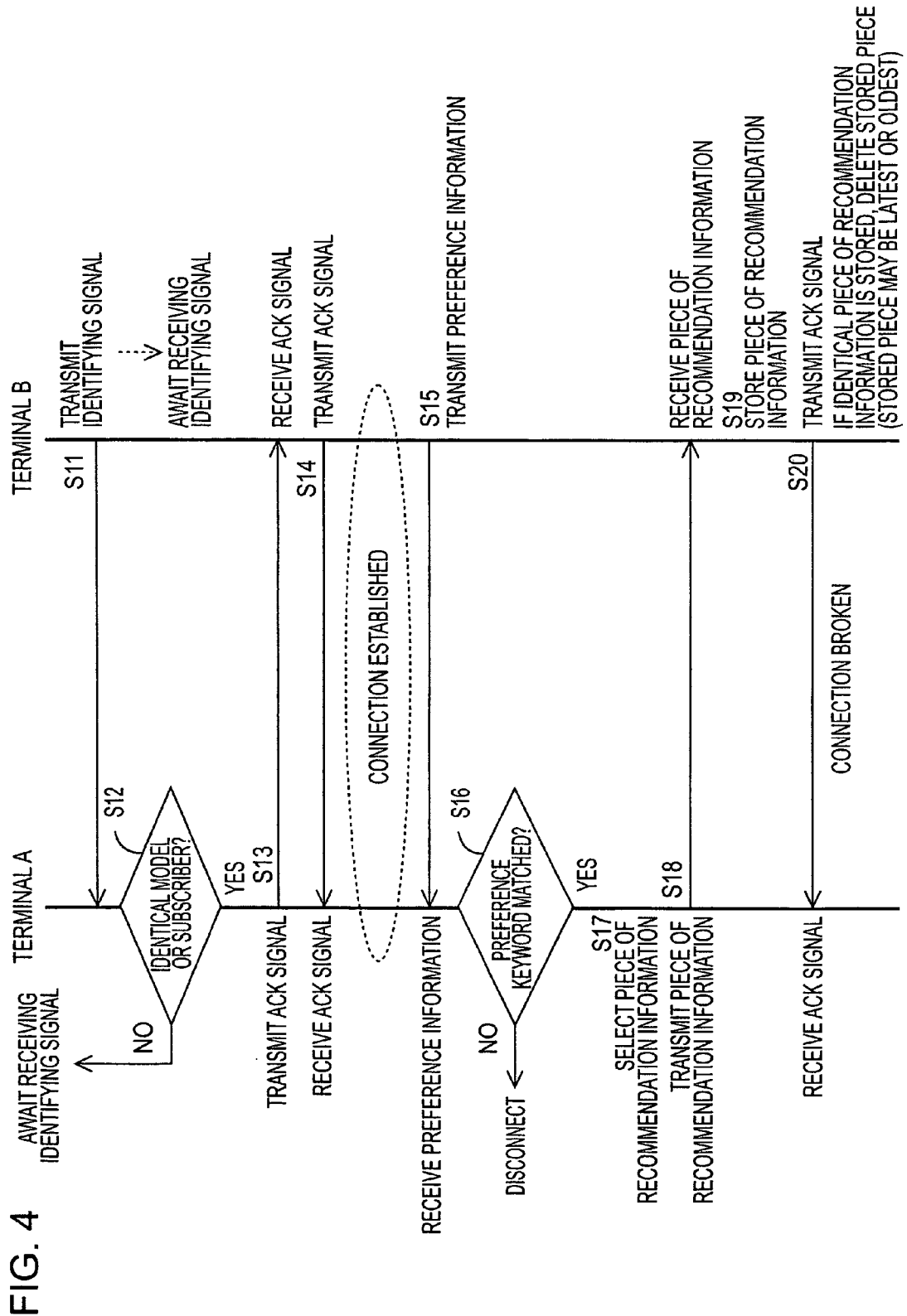
FIG. 4 is a timing chart illustrating a case in which terminal device A provides content recommendation information in response to a request of terminal device B.

FIG. 4 is a timing chart illustrating a case in which terminal device A provides content recommendation information in response to a request of terminal device B. Also in this case, terminal device A is a content-recommendation-information providing side, and terminal device B is a content-recommendation-information receiving side. In step S11, after terminal devices A and B are close to each other within a predetermined distance and terminal device B transmits an identifying signal, the identifying signal is received by terminal device A.

In step S12, on the basis of the received identifying signal, terminal device A determines whether or not the received identification information has been transmitted from a terminal device of a model identical to that of terminal device A, or from a terminal device subscribing a service identical to that subscribed by terminal device A. If, in step S12, it is determined that the received identification information has not been transmitted from the terminal device of a model identical to that of terminal device A or from the terminal device subscribing a service identical to that subscribed by terminal device A, terminal device A ignores the received identification information, and the CPU 1 in the terminal device A controls portions of the terminal device A to await receiving an identifying signal from the other terminal device. After that, terminal device A changes to a transmission mode in which terminal device A transmits an identifying signal.

If, in step S12, it is determined that the received identification information has been transmitted from the terminal device of a model identical to that of terminal device A, or from the terminal device subscribing a service identical to that subscribed by terminal device A, in step S13, terminal device A transmits its identifying signal as an ACK signal to terminal device B.

In step S12, after receiving the ACK signal from terminal device A, terminal device B transmits an ACK signal to terminal device A and terminal device A receives the transmitted ACK signal. As described above, both terminal devices A and B receive the ACK signals, whereby connection is established between both terminal devices, thus enabling communication between terminal devices A and B.

In step S15, terminal device B transmits, to terminal device A, preference information stored in the preference information area of the HDD 4 in terminal device B. Although terminal device B may transmit all data of the preference information area at this time, it may transmit part of the data. One or a small number of preference keywords in part of the preference information area may be selected completely at random, or may be intentionally selected beforehand by the user of terminal device B. Obviously, an intermediate combination of both manners is also possible.

In step S16, after receiving the preference information from terminal device B, terminal device A searches the content recommendation information in the transmitting area of HDD 4 in terminal device A and determines whether or not any one piece of the content recommendation information matches the one or more preference keywords of preference information from terminal device B. If, in step S16, it is determined that any one piece of the content recommendation information does not match the one or more preference keywords of preference information from terminal device B, the CPU 1 in terminal device A performs processing for breaking the connection with terminal device B.

If, in step S16, it is determined that some piece of the content recommendation information matches the one or more preference keywords, in step S17, the CPU 1 in terminal device A selects the matched piece of content recommendation information. In step S18, terminal device A transmits the selected piece of content recommendation information to terminal device B.

When the piece of content recommendation information is transmitted from terminal device A, in step S19, terminal device B receives the transmitted piece of content recommendation information and stores the received piece of content recommendation information in the receiving area of the HDD 4 in terminal device B. After that, in step S20, terminal device B transmits an ACK signal to terminal device A and terminal device A receives the ACK signal, so that the connection between terminal devices A and B is broken.

Also in the second modification, similarly to the above-described first modification, in the process of establishing connection, terminal device B transmits the identification information, including preference keywords, whereby, in this process, after terminal device A checks whether or not its receiving area includes a piece of content recommendation information that matches the preference keywords, connection may be established if the matched piece of content recommendation information is included.

1-5. Third Modification

In the embodiment described with reference to FIG. 2, terminal device B receives content recommendation information from terminal device A, and breaks connection after storing the content recommendation information in the HDD 4. However, the present invention is not limited to the above embodiment. Before terminal device B receives the content recommendation information and breaks the connection with terminal device A, terminal device B may select at least one piece of the content recommendation information stored in the transmitting area of the HDD 4 of terminal device B, and may transmit the at least one piece of the content recommendation information to terminal device A.

By performing the above manner, in the above-described case, regarding provision of content recommendation information, unidirectional provision of the content recommendation information from terminal device A to terminal device B can be changed to bidirectional provision between terminal devices A and B. Accordingly, a communication environment can be realized which has so-called "payback" in which, if content recommendation information is provided to one user, the user provides another user as the provider with other content recommendation information. In other words, in accordance with the principle of give-and-take, a bidirectionally equal communication environment can be established.

In each of the above-described first to third modifications, it is found in terms of results that the user of terminal device A and the user of terminal device B are "like-minded persons" sharing at least one preference keyword. However, when a plurality of preference keywords are transmitted, if it is found which preference keyword is used for preference matching, a possibility that new communication with the keyword recommender may be promoted is generated.

Therefore, in the above case, when content recommendation information is transmitted from terminal device A, in order for a matched preference keyword to be clearly shown, it is preferable to use, for example, highlighted characters, colored characters, characters enclosed in quotation marks, etc., so that the characters are distinguished from other information. When, as a recommender (the user of terminal device A) described in the "Recommender" which is an item included in the provided piece of content recommendation information, an access link (e-mail address or homepage URL) is established, impressions of the piece of content recommendation information, and another comment can also be transmitted to the recommender.

In the communication sequence described with reference to FIG. 2, a case in which terminal device A serves as a providing communication terminal device for providing content recommendation information and terminal device B serves as a receiving communication terminal device for receiving the content recommendation information has been exemplified. However, obviously, there is also a case in which terminal device B serves as a providing communication terminal device for providing content recommendation information and terminal device A serves as a receiving communication terminal device for receiving the content recommendation information.

In addition, the communication sequence can obviously be set so that a terminal device that receives identification information serves as a provider of content recommendation information, differently from a case in which, as described with reference to FIG. 2, a terminal device that transmits an identifying signal serves as a provider of content recommendation information when connection of a communication channel is established.

In the communication sequence described with reference to FIG. 4, a case in which terminal device A serves as a providing communication terminal device for providing content recommendation information and terminal device B serves as a receiving communication terminal device for receiving content recommendation information has been exemplified. However, obviously, there is also a case in which terminal device B serves as a providing communication terminal device for providing content recommendation information and terminal device A receives the content recommendation information.

In addition, obviously, the communication sequence can be set so that a terminal device that transmits identification information serves as a provider of content recommendation information, differently from a case in which, as described with reference to FIG. 4, a terminal device that transmits identification information serves as a provider of content recommendation information when the connection of a communication channel is established.

In other words, the communication sequence in each of the above-described modifications is an example. In accordance with a communication method and communication protocol in use, a communication environment, or the like, the communication sequence for the communication channel may have various forms. Between communication terminal devices, to which the communication channel is connected, content recommendation information may be provided from at least one terminal device to another terminal device. In addition, as described above, it is obviously possible that, when the communication channel is connected, two terminal devices provide content recommendation information to each other.

2. Second Embodiment

Reception of Content Recommendation Information from a Service Spot

Differently from the above-described first embodiment in which content recommendation information is transmitted and received between terminal devices to which an embodiment of the present invention is applied, in a second embodiment of the present invention, content recommendation information is transmitted and received between a server at a service spot and a terminal device. In the second embodiment, a system and method according to embodiments of the present invention are applied.

Specifically, the second embodiment is realized such that, in the above-described first embodiment, one terminal device (e.g., terminal device A) is replaced by a server at a service spot, and communication is performed between the server and terminal device B. Since, in this case, the server does not need to have audio and video playback systems, the server has a configuration without the audio output processor 8, speaker 9, LCD driver 10, and LCD 11 of the terminal device shown in FIG. 1. Terminal device B used in the second embodiment is similar in configuration to the terminal device whose configuration is shown in FIG. 1, and has similar functions.

The "service spot" is a predetermined area in which various types of information are provided to users or members, and in which a server for providing content recommendation information to terminal devices is installed and each server can communicate with the server. Specifically, service spots are provided in various places such as commercial facilities such as CD/DVD shops and bookstores, sightseeing areas, attraction places, art museums, museums, movie theaters, coffee shops, hotel lobbies, and other public facilities.

At the service spot, the installed server provides content recommendation information to a user's terminal device and the terminal device receives and stores the content recommendation information in the HDD 4 of the terminal device. The content recommendation information stored in the HDD 4 of the terminal device is later played back in response to an instruction of the user, whereby the user of the terminal device can obtain and use recommended content information for determining whether or not to purchase the content. Accordingly, by using content recommendation information provided from the server at the service spot to each terminal device, guidance can be performed so that content purchase is facilitated.

FIG. 5 is a timing chart illustrating a communication process performed in the second embodiment between the server and terminal device B. A communication process between the server, which is installed at the service spot, and terminal device B is exemplified. In step S21, terminal device B intermittently transmits an identifying signal unique to terminal device B. Between transmission intervals, terminal device B is in a state of awaiting receiving information from the server.

The server is in a state of awaiting receiving an identifying signal from a terminal device of a member. In step S22, when the server detects reception of the identifying signal, the server determines whether or not the received identifying signal has been transmitted from a normal member. Checking of whether or not the received identifying signal has been transmitted from the normal member can be performed by determining whether or not the received identifying signal matches one of normal-members' identifying signals which are registered in a member database formed in the HDD 4 of the server.

If, in step S22, it is determined that the received identifying signal has not been transmitted from the normal member, the server ignores the reception and awaits receiving an identifying signal. If, in step S22, it is determined that the received identifying signal has been transmitted from the normal member, in step S23, the server generates and transmits an ACK signal to terminal device B, which transmits the identifying signal. The ACK signal is received by terminal device B. In step S24, terminal device B generates and transmits an ACK signal to the server. The server receives the ACK signal to establish connection.

After establishing the connection, in step S25, the CPU 1 of the server determines whether or not the HDD 4 of the server stores a piece of content recommendation information which matches a preference of the member of terminal device B. In the determination of step S25, the CPU 1 of the server performs processing based on preference information of the member of the terminal device B which is stored in the HDD 4 of the server.

If, in step S25, it is determined that the HDD 4 of the server does not store any piece of content recommendation information which matches the preference of the member of terminal device B, the CPU 1 of the server breaks the connection with the connected terminal device B. If, in step S25, it is determined that the HDD 4 of the server stores a piece of content recommendation information which matches the preference of the member of terminal device B, in step S26, from pieces of content recommendation information stored in the transmitting area of the HDD 4 of the server, the CPU 1 of the server selects the piece of content recommendation information that matches the preference of the member of the terminal device B, and, in step S27, transmits the selected piece of content recommendation information. In step S28, the transmitted piece of content recommendation information is received and stored in the HDD 4 of terminal device B.

After terminal device B generates and transmits an ACK signal to the server in step S29. The server receives the ACK signal, and finishes the communication by breaking the connection between the server and terminal device B.

In the description with reference to FIG. 5, the server and terminal device B communicate with each other in an ad hoc mode which is a one-to-one communication mode. In the ad hoc mode, at a certain time, connection with terminal device B is established and content recommendation information is provided. After the connection is broken, a similar response is performed for the next terminal device C. In other words, in the ad hoc mode, even if a service spot has a large number of terminal devices, service is sequentially performed for each of the terminal devices.

In this case, it is to be noted that, even if terminal device B receives content recommendation information, terminal device B may repeatedly perform the same a plural number of times since, in the next step, terminal device B is in a state of awaiting receiving an identifying signal from the server. When this is repeatedly performed a number of times, service opportunities for other terminal devices C, D, E, . . . are reduced, so that both the service provider and each user fail to have satisfaction.

To solve the above, by receiving and recording content recommendation information in the HDD 4, terminal device B may be prevented from being in a state of awaiting receiving the identifying signal for, for example, ten minutes, without returning to the state of awaiting receiving the identifying signal immediately after the connection is broken. Alternatively, in a server-side response, after receiving an identifying signal, terminal device B may transmit the ACK signal in a form including the ID of terminal device B, and may break the connection when receiving again an ACK signal including the same ID within a predetermined period (e.g., within ten minutes).

In addition, the communication can obviously be performed not by using the ad hoc mode that performs one-to-one communication but by using a one-to-many communication mode in which many terminal devices can simultaneously communicate with a server. In order to use the one-to-many communication mode to provide the service in the second embodiment, after, as in multicast or broadcast on the Internet, the server intermittently transmits an identifying signal to an unspecified number of terminal devices, the IDs of terminal devices which respond to the identifying signal can be received and content recommendation information can be provided to each terminal device similarly as above.

As described above with reference to FIG. 5, in the member database formed in the HDD 4 of the server at the service spot, identifying signals such as terminal IDs and personal IDs of members, and preference information of the members are stored beforehand, whereby, only by transmitting an identifying signal from each terminal device to the server, pieces of content recommendation information can be provided in response to the preference of the user of the terminal device.

Since it is not necessary to transmit preference information (a type of personal information) on demand from a terminal device to the server, the amount of information transmitted can be reduced and reliability can be improved. In addition, if terminal ID and personal ID are not directly transmitted as an identifying signal from the terminal device to the server, for example, by using, as key information, an identification code distributed from the server provider to each member, and transmitting the terminal ID and personal ID as an identifying signal in encrypted form, the service can be enjoyed more safely. If the identification code is uniquely determined, only the identification code may be transmitted.

Updating of the preference information recorded in the server can be performed, for example, by using a personal computer at a home to access a service site through a network such as the Internet. Accordingly, an embodiment of the present invention can be applied to even a terminal device such as a cellular phone in which character entering is inconvenient and which has a limited amount of storage.

In the above-described second embodiment, a communication channel is connected by transmitting an identifying signal from a terminal device to a server. However, the second embodiment is not limited to this form. Instead, provision of content recommendation information can obviously be performed by transmitting a response request from a server and connecting a communication channel with a terminal device which receives the response request to respond to the server.

In other words, the communication sequence in the above-described second embodiment is an example. Accordingly, in accordance with a communication method and communication protocol in use, a communication environment, or the like, the connection sequence of the communication channel may have various forms. In addition, it is also possible to perform updating information in a server by transmitting user's latest preference information from a terminal device to the server, and providing content recommendation information corresponding to the latest preference information.

In the above-described first and second embodiments, a user simply carries a user's terminal device, whereby so-called "log information" can be stored in a storage unit such as an HDD of the user's terminal device. The stored log information is designed to include content recommendation information, as described above. Accordingly, pieces of content recommendation information from many terminal devices can automatically be collected.

A terminal device that receives content recommendation information can display acquired content recommendation information on a display of the terminal device or a display of a personal computer at a later time or later date, and can play back a recommendation comment and sample data (sample content). These pieces of information can be used as an effective criterion for determining whether or not to purchase recommended content. Therefore, favorite content can easily and reliably be found, and facilitated purchase of the content, etc., can be performed.

In addition, content recommendation information that matches preference information of the user of a terminal device can be obtained, and content recommendation information customized for each user can be transmitted and received.

In addition, a recommendation comment and sample data, etc., which are acquired by a user can be provided as user's content recommendation information to another user, so that a massive effect of word-of-mouth sales promotion can be expected.

Although, in the above-described embodiments, each of terminal devices A and B transmit and receive content recommendation information, in a normal mode, it only performs intermittently transmitting an identifying signal representing information, such as terminal ID and personal ID, which has a small amount of information, and receiving an identifying signal from another terminal device between identifying signal transmitting intervals. Thus, terminal devices A and B only need small power consumption, thus making it possible to collect content recommendation information for a relatively long time.

In the above-described embodiments, terminal devices A and B have been described as portable terminal devices, but terminal devices A and B are not limited thereto. For example, an embodiment of the present invention is applicable to an on-vehicle communication apparatus, etc.

When an embodiment of the present invention is applied to an on-vehicle communication apparatus or the like, for example, while an automobile provided with the on-vehicle communication apparatus is waiting for the traffic light to change, by connecting a communication channel to a communication apparatus provided in another automobile, the on-vehicle communication apparatus can transmit and receive content recommendation information. In addition, by connecting a communication channel to a server installed in a gas station, the on-vehicle communication apparatus can perform operations such as providing content recommendation information from the server to the communication apparatus.

Moreover, at an entrance gate of a toll road, by transmitting traffic information of the toll road to a communication apparatus provided in each automobile, the communication apparatus can perform operations such as displaying, for user's confirmation, the traffic information on a display screen of a navigation system, and outputting the traffic information as audio information so that the user can hear the traffic information. In addition, at an exit gate of the toll road, by transmitting, to the communication apparatus provided in each automobile, map information of a map around the exit gate, the communication apparatus can perform operations such as displaying the map information on the display screen of the navigation system for user's confirmation.

In recent years, a wireless automatic fare collection system, called an "ETC (electronic toll collection)", has become used. Accordingly, by using the ETC, not only toll collection information, but also information, such as traffic information, map information, guidance information concerning scenic spots and places of historical interest, can be provided to a communication terminal device provided in each automobile or a communication terminal device carried by a user, and the provided information can be utilized.

As described above, in the above-described embodiments and modifications, the content recommendation information means, not only recommendation information concerning so-called "digital content" such as music and movies, but also, in a broad sense, various types of information, such as traffic information and map information, which is to be transmitted to a communication terminal device for use by the user. Also in this case, if detailed information is necessary, it may be separately acquired.

The content recommendation information may be information that can promote use and purchase of various types of goods such as food, electronic devices, books, sporting goods, and commodities. In other words, the content recommendation information includes varieties for providing various types of information concerning information and things which are useful for the terminal device's user.

An embodiment of the present invention is applicable to notebook personal computers, portable information terminal devices called "PDAs (personal digital assistants)", cellular phone terminal devices, other portable information devices of various types, on-vehicle GPS systems, and various types of on-vehicle information processing apparatuses such as on-vehicle audio apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A content recommendation system comprising:
    a first portable communication device adapted to be carried by a first user; and
    a second portable communication device adapted to be carried by a second user,
    wherein the first portable communication device and the second portable communication device are within communication range of each other and are connected to each other wirelessly without using an access point, and content recommendation information is transmitted and received between the first portable communication device and the second portable communication device, wherein the content recommendation information enables the second user to determine whether further information concerning the at least one of audio, image, book, traffic, or map content data is desired, and wherein the content recommendation information comprises a user-generated textual comment concerning the at least one of audio, image, book, traffic, or map content data;
    the first portable communication device comprises:
        storage means which stores pieces of content recommendation information to be transmitted,
        selecting means which accesses user preference information associated with the second portable communication device, the user preference information comprising at least one alphabetic preference keyword, and selects, based at least in part on the user preference information associated with the second portable communication device, a piece of content recommendation information to be transmitted to the second portable communication device, from among the pieces of content recommendation information stored in the storage means, the piece of content recommendation information matching the at least one alphabetic preference keyword, and
        transmitting means which transmits the piece of content recommendation information selected by the selecting means to the second portable communication device; and
    the second portable communication device comprises:
        receiving means which receives the piece of content recommendation information transmitted from the first portable communication device, and
        storage means which stores the piece of content recommendation information received by the receiving means.

2. The content recommendation system according to claim 1, wherein:
    the second portable communication device further comprises transmitting means which transmits user preference information concerning content; and
    the first portable communication device further comprises receiving means which receives the user preference information transmitted from the second portable communication device; and
    in the first portable communication device, the selecting means selects the piece of content recommendation information, which matches the user preference information received by the receiving means.

3. The content recommendation system according to claim 1, wherein:
    the second portable communication device further comprises transmitting means which transmits identification information of the second portable communication device to the first portable communication device;
    the first portable communication device further comprises:
        preference-information storage means which stores the identification information of the second portable communication device, and preference information of content for the second user who is identified by the identification information of the second portable communication device, in a form in which the identification information of the second portable communication device and the preference information are associated with each other, and receiving means which receives the identification information of the second portable communication device transmitted from the second portable communication device; and in the first portable communication device, the selecting means extracts a piece of the preference information stored in the preference-information storage means correspondingly to the identification information of the second portable communication device received by the receiving means, and selects the piece of content recommendation information, which matches the piece of the preference information.

4. The content recommendation system according to claim 1, wherein the second portable communication device further comprises storage control means in which, when a piece of information identical to the piece of content recommendation information received by the receiving means of the second portable communication device is not included in pieces of content recommendation information stored in the storage means of the second portable communication device, the storage control means controls the storage means of the second portable communication device to store the piece of content recommendation information received by the receiving means of the second portable communication device.

5. A communication terminal device adapted to be carried by a first user, the communication terminal device being a first portable device comprising:
   communication means which establishes, without using an access point, wireless communication with a second portable device adapted to be carried by a second user, when the second portable device is within communication range of the first portable device, the second portable device being different from the first portable device;
   transmitting-information storage means which stores pieces of content recommendation information to be transmitted, wherein the content recommendation information enables the second user to determine whether further information concerning the at least one of audio, image, book, traffic, or map content data is desired, and wherein the content recommendation information comprises a user-generated textual comment concerning the at least one of audio, image, book, traffic, or map content data;
   selecting means which accesses user preference information associated with the second portable device, the user preference information comprising at least one alphabetic preference keyword, and selects, based at least in part on the user preference information associated with the second portable device, a piece of content recommendation information to be transmitted to the second portable device, from among the pieces of content recommendation information stored in the transmitting-information storage means, the piece of content recommendation information matching the at least one alphabetic preference keyword; and
   transmission control means which controls the communication means to transmit the piece of content recommendation information selected by the selecting means to the second portable device.

6. The communication terminal device according to claim 5, further comprising received information storage means in which, when a piece of content recommendation information addressed to the first portable device is received by the communication means, the received information storage means stores the piece of content recommendation information received by the communication means.

7. The communication terminal device according to claim 6, further comprising storage control means in which, when a piece of information identical to the piece of content recommendation information received by the communication means is not included in pieces of content recommendation information stored in the received information storage means, the storage control means stores the piece of content recommendation information received by the communication means.

8. The communication terminal device according to claim 5, further comprising identification-information storage means which stores identification information of the second portable device, and preference information of content for the second user in a form in which the identification information of the second portable device and the preference information are associated with each other,
   wherein, when the identification information of the second portable device is received by the communication means, the selecting means extracts the preference information from the identification-information storage means on the basis of the received identification information of the second portable device, and, from among the pieces of content recommendation information stored in the transmitting-information storage means, selects the piece of content recommendation information, which matches the extracted preference information.

9. A content recommendation method for transmitting and receiving content recommendation information between first and second portable communication devices that are within communication range of each other and are connected to each other wirelessly without using an access point, the first portable communication device being adapted to be carried by a first user and the second portable communication device being adapted to be carried by a second user, the content recommendation method comprising the steps of:
   by the first portable communication device, accessing user preference information associated with the second portable communication device;
   by the first portable communication device, selecting, based at least in part on the user preference information associated with the second portable communication device, a piece of content recommendation information to be transmitted to the second portable communication device, from among pieces of content recommendation information stored in the first portable communication device, wherein the content recommendation information enables the second user to determine whether further information concerning the at least one of audio, image, book, traffic, or map content data is desired, and wherein the content recommendation information comprises a user-generated textual comment concerning the at least one of audio, image, book, traffic, or map content data;
   by the first portable communication device, transmitting the piece of content recommendation information selected in the selecting step to the second portable communication device;
   by the second portable communication device, receiving the piece of content recommendation information transmitted from the first portable communication device; and
   by the second portable communication device, storing the piece of content recommendation information received in the receiving step in storage means included in the second portable communication device.

10. A content recommendation system comprising:
a first portable communication device adapted to be carried by a first user; and
a second portable communication device adapted to be carried by a second user,
wherein the first portable communication device and the second portable communication device are within communication range of each other and are connected to each other wirelessly without using an access point, and content recommendation information is transmitted and received between the first portable communication device and the second portable communication device, wherein the content recommendation information enables the second user to determine whether further information concerning the at least one of audio, image, book, traffic, or map content data is desired, and wherein the content recommendation information comprises a user-generated textual comment concerning the at least one of audio, image, book, traffic, or map content data;
the first portable communication device comprises:
  a storage section storing pieces of content recommendation information to be transmitted,
  a selecting section accessing user preference information associated with the second portable communication device, the user preference information comprising at least one alphabetic preference keyword and selecting, based at least in part on the user preference information associated with the second portable communication device, a piece of content recommendation information to be transmitted to the second portable communication device, from among the pieces of content recommendation information stored in the storage section, the piece of content recommendation information matching the at least one alphabetic preference keyword, and
  a transmitting section transmitting the piece of content recommendation information selected by the selecting section to the second portable communication device;
the second portable communication device comprises:
  a receiving section receiving the piece of content recommendation information transmitted from the first portable communication device, and
  a storage section storing the piece of content recommendation information received by the receiving section.

11. A communication terminal device adapted to be carried by a first user, the communication terminal device being a first portable device comprising:
  a communication section establishing, without using an access point, wireless communication with a second portable device adapted to be carried by a second user, when the second portable device is within communication range of the first portable device, the second portable device being different from the first portable device;
  a transmitting-information storage section storing pieces of content recommendation information to be transmitted, wherein the content recommendation information enables the second user to determine whether further information concerning the at least one of audio, image, book, traffic, or map content data is desired, and wherein the content recommendation information comprises a user-generated textual comment concerning the at least one of audio, image, book, traffic, or map content data;
  a selecting section accessing user preference information associated with the second portable device and selecting, based at least in part on the user preference information associated with the second portable device, a piece of content recommendation information to be transmitted to the second portable device, from among the pieces of content recommendation information stored in the transmitting-information storage section; and
  a transmission control section controlling the communication section to transmit the piece of content recommendation information selected by the selecting section to the second portable device.

12. The content recommendation system of claim 1, wherein the content recommendation information comprises a sample of the at least one of audio, image, book, traffic, or map content data or information that enables access thereof.

13. The communication terminal device of claim 5, wherein the content recommendation information comprises a sample of the at least one of audio, image, book, traffic, or map content data or information that enables access thereof.

14. The content recommendation method of claim 9, wherein the content recommendation information comprises a sample of the at least one of audio, image, book, traffic, or map content data or information that enables access thereof.

15. The content recommendation system of claim 10, wherein the content recommendation information comprises a sample of the at least one of audio, image, book, traffic, or map content data or information that enables access thereof.

16. The communication terminal device of claim 11, wherein the suggestion or recommendation concerning the at least one of audio, image, book, traffic, or map content data comprises a sample of the at least one of audio, image, book, traffic, or map content data or information that enables access thereof.

17. The content recommendation system of claim 1, wherein the user-generated textual comment concerning the at least one of audio, image, book, traffic, or map content data comprises a user's reason for recommending the at least one of audio, image, book, traffic, or map content data.

18. The communication terminal device of claim 5, wherein the user-generated textual comment concerning the at least one of audio, image, book, traffic, or map content data comprises a user's reason for recommending the at least one of audio, image, book, traffic, or map content data.

19. The content recommendation method of claim 9, wherein the user-generated textual comment concerning the at least one of audio, image, book, traffic, or map content data comprises a user's reason for recommending the at least one of audio, image, book, traffic, or map content data.

20. The content recommendation system of claim 10, wherein the user-generated textual comment concerning the at least one of audio, image, book, traffic, or map content data comprises a user's reason for recommending the at least one of audio, image, book, traffic, or map content data.

21. The communication terminal device of claim 11, wherein the user-generated textual comment concerning the at least one of audio, image, book, traffic, or map content data comprises a user's reason for recommending the at least one of audio, image, book, traffic, or map content data.

* * * * *